US011878504B2

(12) United States Patent
Yamamoto et al.

(10) Patent No.: US 11,878,504 B2
(45) Date of Patent: Jan. 23, 2024

(54) PLATE-MAKING METHOD, PLATE-MAKING SYSTEM AND CAN BODY

(71) Applicant: Toyo Seikan Co., Ltd., Tokyo (JP)

(72) Inventors: Kenichiro Yamamoto, Tokyo (JP); Ryota Nagatsuka, Tokyo (JP); Keisuke Sanuki, Tokyo (JP); Iori Takatori, Kanagawa (JP); Yukiko Saito, Kanagawa (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 96 days.

(21) Appl. No.: 17/703,283

(22) Filed: Mar. 24, 2022

(65) Prior Publication Data

US 2022/0212461 A1 Jul. 7, 2022

Related U.S. Application Data

(63) Continuation of application No. PCT/JP2020/038003, filed on Oct. 7, 2020.

(30) Foreign Application Priority Data

Oct. 10, 2019 (JP) ................................ 2019-186724
Oct. 10, 2019 (JP) ................................ 2019-186725

(51) Int. Cl.
  *B41C 1/12* (2006.01)
  *H04N 1/52* (2006.01)
  (Continued)

(52) U.S. Cl.
  CPC .................. *B41C 1/12* (2013.01); *B41C 1/18* (2013.01); *H04N 1/52* (2013.01); *B41M 1/40* (2013.01)

(58) Field of Classification Search
  None
  See application file for complete search history.

(56) References Cited

U.S. PATENT DOCUMENTS 8,400,681 B1  3/2013 Moravcik
2005/0099642 A1  5/2005 Segawa et al.
(Continued)

FOREIGN PATENT DOCUMENTS

CN 1044618 A 8/1990
CN 102568020 A 7/2012
(Continued)

OTHER PUBLICATIONS

Notice of Refusal cited in Japanese Patent Application No. 2019-186724 dated Feb. 24, 2021.
(Continued)

*Primary Examiner* — Lennin R Rodriguezgonzalez
*Assistant Examiner* — Lennin R Rodriguez
(74) *Attorney, Agent, or Firm* — BACON&THOMAS,PLLC

(57) ABSTRACT

A plate-making method for manufacturing a printing plate includes: manufacturing the printing plate based on a knock-out method in which knockouts of halftone dots in one color are formed, and halftone dots in the other color are over-printed onto positions of the knockouts; for each of pixels, when a sum of a halftone dot area ratio of the one color and a halftone dot area ratio of the other color is smaller than 100%, forming a gap from a knockout in the one color around a halftone dot in the other color; and for each of pixels, when the sum of the halftone dot area ratio of the one color and the halftone dot area ratio of the other color is greater than 100%, forming an overmask such that the halftone dot in the other color penetrates a periphery of the halftone dot in the one color.

12 Claims, 11 Drawing Sheets

(51) Int. Cl.
  *B41C 1/18* (2006.01)
  *B41M 1/40* (2006.01)

(56) References Cited

U.S. PATENT DOCUMENTS

| | | | | |
|---|---|---|---|---|
| 2006/0012662 | A1* | 1/2006 | Ferland | G03F 3/108 |
| | | | | 347/155 |
| 2009/0091796 | A1* | 4/2009 | Hirota | H04N 1/52 |
| | | | | 358/3.13 |

FOREIGN PATENT DOCUMENTS

| | | | |
|---|---|---|---|
| CN | 203352307 | A | 12/2013 |
| CN | 103837537 | A | 6/2014 |
| EP | 0705024 | A2 | 4/1996 |
| JP | S63162240 | A | 7/1988 |
| JP | H02122975 | A | 5/1990 |
| JP | A-H07-057543 | A | 3/1995 |
| JP | 8-102845 | A | 4/1996 |
| JP | 2000-318327 | A | 11/2000 |
| JP | 2005-167970 | A | 6/2005 |
| WO | WO2019/189535 | A1 | 10/2019 |
| WO | WO2019189535 | A | 10/2019 |
| WO | WO2021070865 | A1 | 4/2021 |

OTHER PUBLICATIONS

ISR cited in International Appln. PCT/JP2020/038003.
English Translation of the Written Opinion of the ISA (PCT/ISA/237).
Search Report cited in corresponding International Appln. No. PCT/JP2020/038003 dated Aug. 29, 2023.
Anonymous: "Imaging Engine 14.1 User Guide", dated Aug. 1, 2015, XP055403766, retrieved from the Internet: URL: https://docs.esko.com/docs/en-us/automationengine/14.1/userguide/pdf/ImagingEngine_141.pdf., (retrieved on Sep. 5, 2017).
OA cited in corresponding Iranian Appln. No. 140150140003000128 /with English Translation.

* cited by examiner

FIG. 6A
FIG. 6B
FIG. 6C
FIG. 6D
FIG. 6E
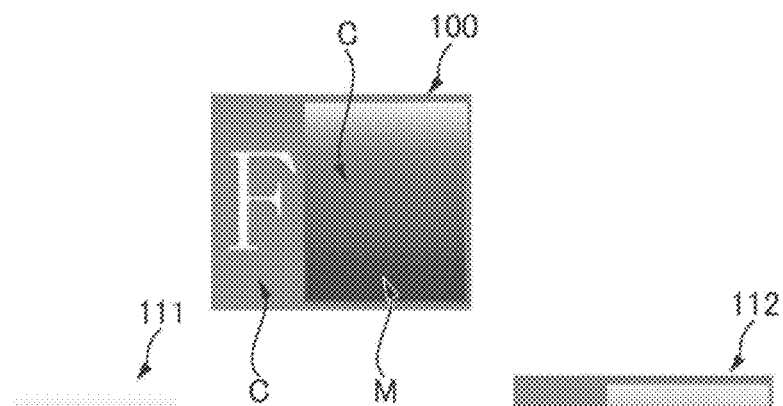
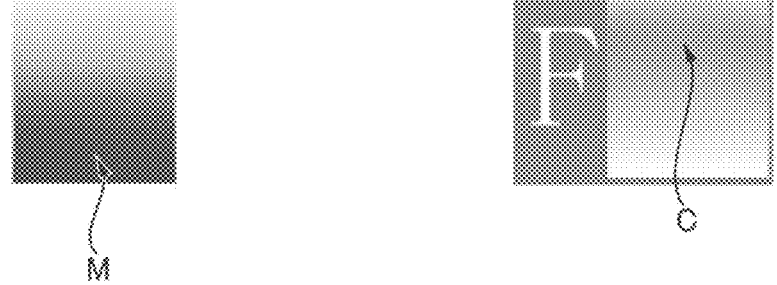
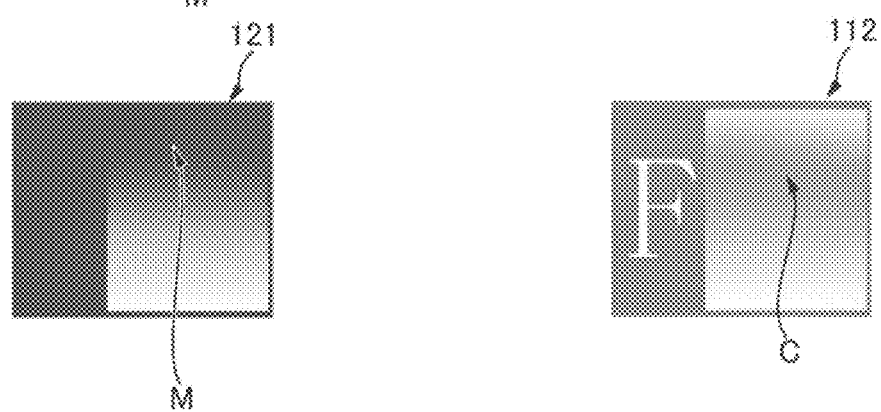
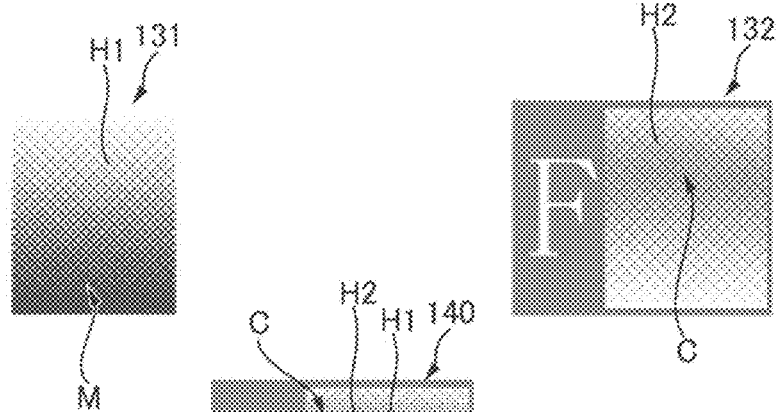
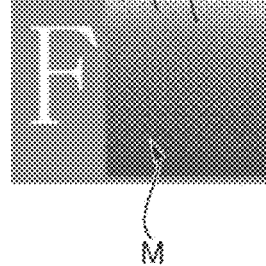

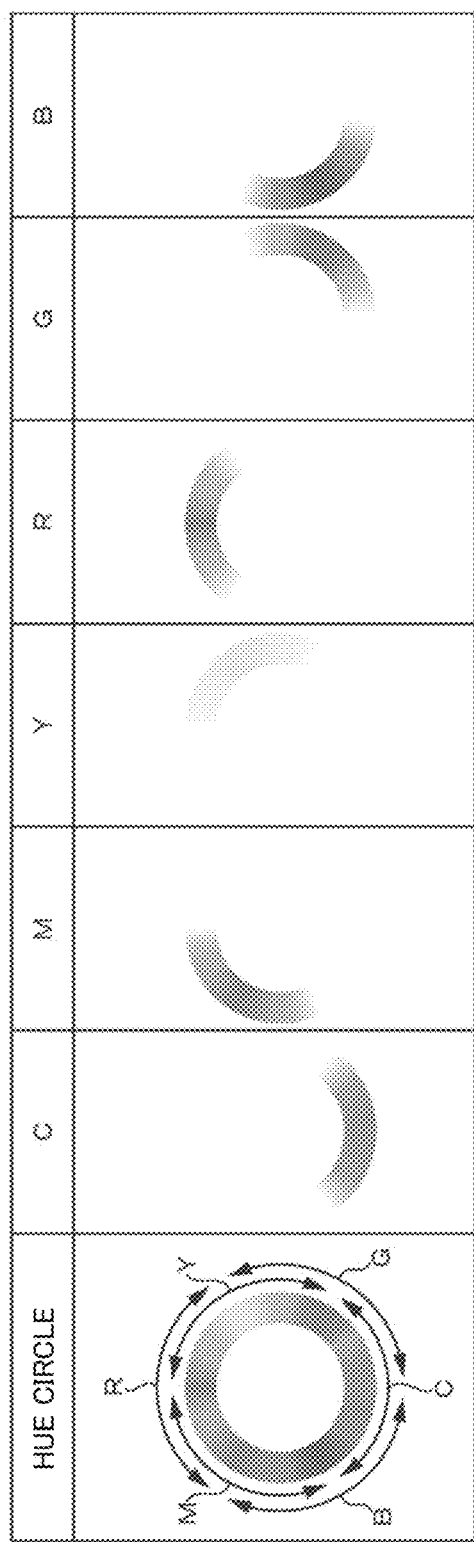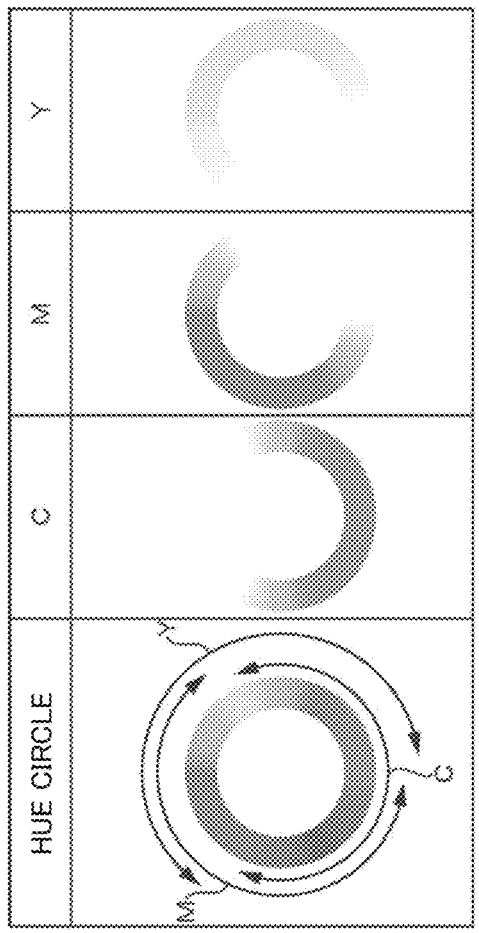
FIG. 8A
FIG. 8B

PLATE-MAKING METHOD, PLATE-MAKING SYSTEM AND CAN BODY

CROSS-REFERENCE TO RELATED APPLICATIONS

The present application is a continuation application of PCT international application No. PCT/JP2020/038003 filed on Oct. 7, 2020 which claims priority from Japanese Patent Application No. 2019-186274 filed on Oct. 10, 2019, and Japanese Patent Application No. 2019-186275 filed on Oct. 10, 2019, and the entire contents of which are hereby incorporated by reference.

BACKGROUND

1. Technical Field

The present invention relates to a plate-making method, a plate-making system, and a can body.

2. Related Art

A printing plate attached to a printer for multicolor printing is manufactured based on image data obtained by separating colors of an original image into each of the color and forming halftone dots. See, for example, Japanese Examined Patent Application Publication No. H7-57543.

Japanese Examined Patent Application Publication No. H7-57543 describes a plate-making method for manufacturing a printing plate for each of colors based on image data subjected to image shrinkage, including: forming halftone dots of image data in basic four colors after color separation; changing the colors of the image data to seven colors which do not overlap each other; applying the image shrinkage to the image data in the changed seven colors to prevent the bleeding of inks or restrain the inks from being mixed and murky due to the mechanical displacement of the printer.

SUMMARY

According to the invention, a plate-making method for manufacturing a printing plate based on image data separated into each of colors and representing halftone dots includes: manufacturing the printing plate based on a knockout method in which knockouts of halftone dots in one color are formed, and halftone dots in the other color are overprinted onto positions of the knockouts; for each of pixels, when a sum of a halftone dot area ratio of the one color and a halftone dot area ratio of the other color is smaller than 100%, forming a gap from a knockout in the one color around a halftone dot in the other color; and for each of pixels, when the sum of the halftone dot area ratio of the one color and the halftone dot area ratio of the other color is greater than 100%, forming an overmask such that the halftone dot in the other color penetrates a periphery of the halftone dot in the one color.

BRIEF DESCRIPTION OF THE DRAWINGS

FIGS. 6A-6E illustrate the flow of the plate-making method illustrated in FIG. 5;
FIGS. 8A-8B illustrate color separation using a hue circle.

DETAILED DESCRIPTION

With the technology described in Japanese Examined Patent Application Publication No. H7-57543, the image shrinkage is applied to the image data representing halftone dots, and therefore the base color tends to be exposed and the color gamut which is a region of reproducible colors tends to be limited, and consequently the color reproducibility tends to lower. With the technology described in Patent Literature 1, however, when the image shrinkage is not applied in order to secure a wide color gamut to maintain a high color reproducibility, the inks tends to be mixed and murky. In addition, with the technology described in Patent Literature 1, when the image shrinkage is not applied, there may need highly accurate registration which can adjust the mechanical displacement of the printer. Moreover, moire tends to occur because the halftone dots in the seven colors overlap each other.

The present invention has been achieved considering the above-described circumstances to address the above-described problems. It is therefore an aspect of the object of the invention to manufacture printing plates capable of restraining inks from being mixed and murky, and providing easy registration and a high color reproducibility. In addition, an aspect of the object of the invention is to provide a can body printed by a technique capable of restraining inks from being mixed and murky, and providing easy registration and a high reproducibility. Moreover, another aspect of the object of the invention is to manufacture printing plates capable of securing a wide color gamut only by process colors, restraining the occurrence of moire, and restraining inks from being mixed and murky. Furthermore, an aspect of the object of the invention is to provide a can body printed by a technique capable of securing a wide color gamut only by process colors, restraining the occurrence of moire, and restraining inks from being mixed and murky.

Hereinafter, embodiments of the invention will be described with reference to the drawings. The embodiments described later illustrate some examples of the invention, but do not limit the subject matter of the invention. In addition, all the configurations and the operations described in the embodiments are not necessarily essential as the configurations and the operations of the invention.

Embodiment 1

Configuration of Plate-Making System

Figure 1:
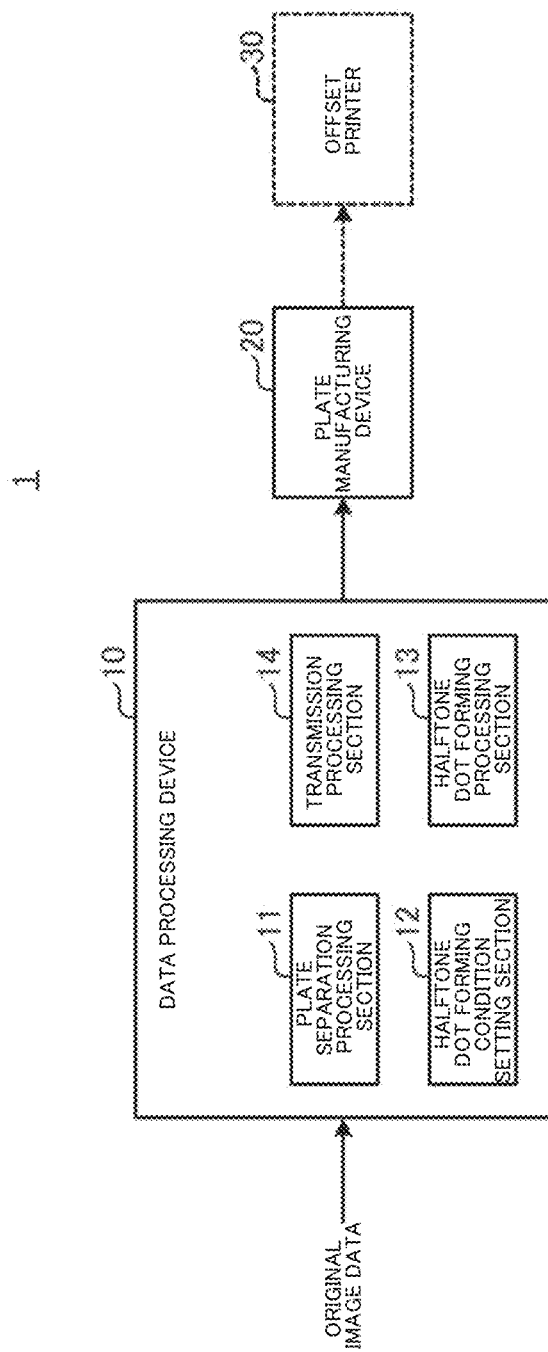
FIG. 1 illustrates the configuration of a plate-making system according to Embodiment 1.
Figure 2A:
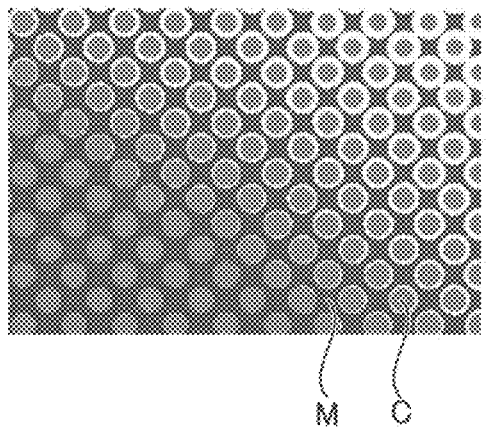
FIG. 2A illustrates a knockout method.
Figure 2B:
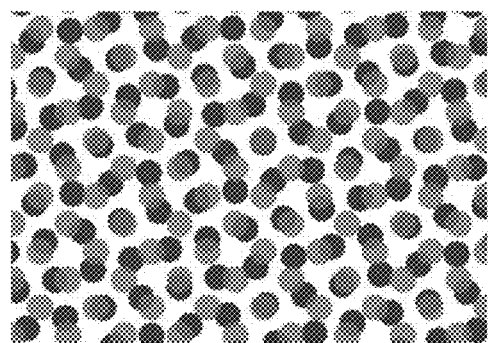
FIG. 2B illustrates an overprint method.

FIG. 1 illustrates the configuration of a plate-making system 1 according to Embodiment 1. FIGS. 2A and 2B illustrate a knockout method and an overprint method.

The plate-making system 1 is a system configured to manufacture printing plates attached to a plate-type printer. The plate-making system 1 is a system adopting DTP (DeskTopPublishing) and CTP (ComputerToPlate). The plate-making system 1 is a system configured to manufacture printing plates for multicolor printing.

A printed material for the printing plate manufactured by the plate-making system 1 is a can body such as a two-piece can having an approximately cylindrical shape, or a flat metal plate. In addition, the plate-making system 1 is a system configured to manufacture printing plates attached to an offset printer configured to transfer inks via an intermediate transfer member, or a non-offset printer configured not to use the intermediate transfer member.

FIG. 1 illustrates the plate-making system 1 configured to manufacture printing plates attached to an offset printer 30 configured to transfer inks to the outer circumferential surface of a printed material via the intermediate transfer member. The printed material is a two-piece can and so forth having an approximately cylindrical shape. It is preferred that the printing plate manufactured by the plate-making system 1 illustrated in FIG. 1 is a resin letterpress plate having image areas with ink which are formed by a photosensitive resin layer and so forth. It is preferred that the plate-making system 1 illustrated in FIG. 1 is a system configured to manufacture printing plates by DLE (Direct Laser Engraving) method in which resin is sublimated by the heat of the laser and engraved, or LAMS (Laser Ablation Masking System) method in which an image is written to the surface of a resin plate by using the laser and is developed. Alternatively, the printing plate manufactured by the plate-making system 1 illustrated in FIG. 1 may be a waterless planographic plate not using dampening water and having non-image areas without ink which are formed by a silicone resin layer.

The plate-making system 1 includes a data processing device 10 configured to create image data for plate-making by applying various image processing to original image data, and a plate manufacturing device 20 configured to manufacture printing plates based on the image data for plate-making.

The data processing device 10 is configured to edit, for example, modify the layout and the color tone of the original image data described by the page-description language. Then, the data processing device 10 creates the image data for plate-making by performing plate separation processing such as the color separation of process colors and spot colors, and performing halftone dot forming processing to represent the shading of each of the colors by aggregation of halftone dots, and transmits the image data to the plate manufacturing device 20. The data processing device 10 includes a processor, a memory, and a program implementing the function of the data processing device 10.

The data processing device 10 includes a plate separation processing section 11 configured to perform plate separation processing, a halftone dot forming condition setting section 12 configured to set the conditions of the halftone dot forming processing, a halftone dot forming processing section 13 configured to perform the halftone dot forming processing, and a transmission processing section 14 configured to perform transmission processing to transmit data to the plate manufacturing device 20.

The plate separation processing section 11 separates the colors of the edited original image data into each of the process colors and the spot colors, and applies UCR (under color removal) to parts where the colors overlap each other to reproduce achromatic colors. The process colors may be, for example, four colors, cyan, magenta, yellow, and black, or seven colors, red, green, and blue in addition to the four colors. The plate separation processing section 11 creates plate separation image data which is image data for each of the colors extracted by the color separation of the original image data.

The halftone dot forming condition setting section 12 sets halftone dot forming conditions to form halftone dots of the plate separation image data created by the plate separation processing section 11. The halftone dot forming conditions are set to the plate separation image data for each of the colors. The halftone dot forming conditions include the halftone dot shape, the halftone dot area ratio, the number of screen lines, and the screen angle for each of the colors, as well as the condition for the knockout method.

The plate-making system 1 manufactures printing plates capable of representing colors other than the colors extracted by the color separation, by overprinting the inks in the colors extracted by the color separation. In this case, the plate-making system 1 can manufacture printing plates capable of overprinting the colors extracted by the color separation by the knockout method. The knockout method is a technique to form knockouts of the halftone dots in one of two colors to be overprinted which is close to the base of a printed material, and overprint the halftone dots in the other color far from the base of the printed material onto the positions of the knockouts. The color of the halftone dots to be knocked out may be far from the base of the printed material.

It is preferred that, when the process colors are four colors, cyan, magenta, yellow, and black, the two colors overprinted by the knockout method are selected from cyan, magenta, and yellow. Alternatively, it is preferred that, when the process colors are seven colors, cyan, magenta, yellow, red, green, blue, and black, the two colors overprinted by the knockout method are one color selected from cyan, magenta, and yellow, and one color selected from red, green, and blue.

With an example illustrated in FIG. 2A, one color is magenta M, and the other color is cyan C, and the magenta M and the cyan C are overprinted by the knockout method. In FIG. 2A, the knockouts of halftone dots are formed in the magenta M as one color at positions on which the cyan C as the other color is put. In other words, it is set that the halftone dots in the cyan C as the other color are located in the positions of the knockouts of the halftone dots in the magenta M as one color. With the knockout method, the ink in one color and the ink in the other color are overpainted without contacting one another as much as possible.

In contrast, in order to represent colors other than the colors extracted by the color separation, conventional plate-making systems often manufacture printing plates to overprint the colors extracted by the color separation by the overprint method as illustrated in FIG. 2B. With the overprint method, no knockout is formed for the halftone dots in both of the two colors to be overprinted. With the overprint method, at least part of the halftone dots in one of the two colors to be overprinted is put on the halftone dots in the other color, and therefore the ink in one color and the ink in the other color contact one another, and are overprinted.

The halftone dot forming condition setting section 12 designates the plate separation image data for each of the two colors targeted for the knockout method, as the condition for the knockout method which is one of the halftone dot forming conditions. Then, the halftone dot forming condition setting section 12 sets the halftone dot area ratio of one color and the halftone dot area ratio of the other color for each of the pixels of the designated plate separation image data. Detailed setting contents of the halftone dot area ratio of each of one color and the other color targeted for the knockout method will be described with reference to FIGS. 3A and 3B, and FIG. 4.

The halftone dot forming processing section 13 forms halftone dots of the plate separation image data created by the plate separation processing section 11, based on the halftone dot forming conditions set by the halftone dot forming condition setting section 12. The image data representing the halftone dots is binary data such as 1 bit TIFF (Tagged Image File Format). The image data representing the halftone dots is used as image data for plate-making when the plate manufacturing device 20 manufactures printing plates. The halftone dot forming processing section 13 may be configured as a software RIP (Raster Image Processor).

To form halftone dots of the plate separation image data for each of two colors targeted for the knockout method, the halftone dot forming processing section 13 forms the halftone dots under the different conditions between one color and the other color. To be more specific, to form halftone dots of the plate separation image data in one color, the halftone dot forming processing section 13 creates reverse image data once by reversing the shading of the one color, and forms halftone dots of the created reverse image data on the negative condition. On the negative condition, for each of the pixels, the lower the density of the color is, the higher the halftone dot area ratio is. On the other hand, to form halftone dots of the plate separation image data in the other color, the halftone dot forming processing section 13 forms halftone dots of the plate separation image data in the other color as is on the positive condition. On the positive condition, for each of the pixels, the higher the density of the color is, the higher the halftone dot area ratio is.

The transmission processing section 14 performs processing to transmit the image data representing the halftone dots formed by the halftone dot forming processing section 13 to the plate manufacturing device 20 as image data for plate-making.

The plate manufacturing device 20 manufactures a printing plate for each of the colors based on the image data transmitted from the transmission processing section 14 of the data processing device 10, that is, the image data representing the halftone dots for each of the colors. It is preferred that the plate manufacturing device 20 is a device configured to manufacture printing plates by the above-described DLE method or LAMS method. The plate manufacturing device 20 can manufacture printing plates by laser engraving or laser exposure of a resin plate to form image areas and non-image areas, based on the image data representing the halftone dots for each of the colors.

Halftone Dot Forming Condition for Knockout Method

Figure 3A:
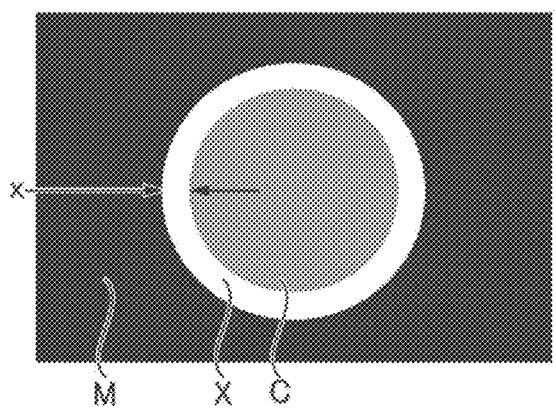
FIG. 3A illustrates a gap formed with one color and the other color targeted for the knockout method.
Figure 3B:
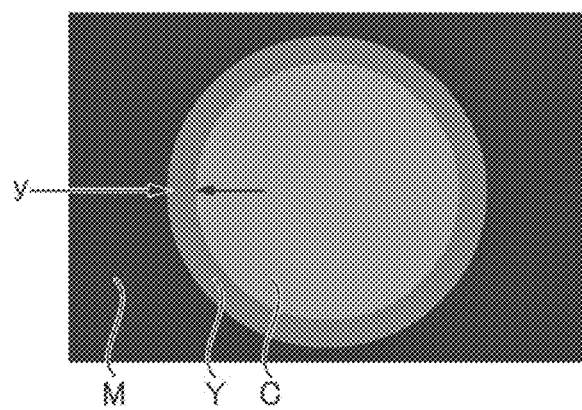
FIG. 3B illustrates an overmask formed with one color and the other color targeted for the knockout method.
Figure 4:
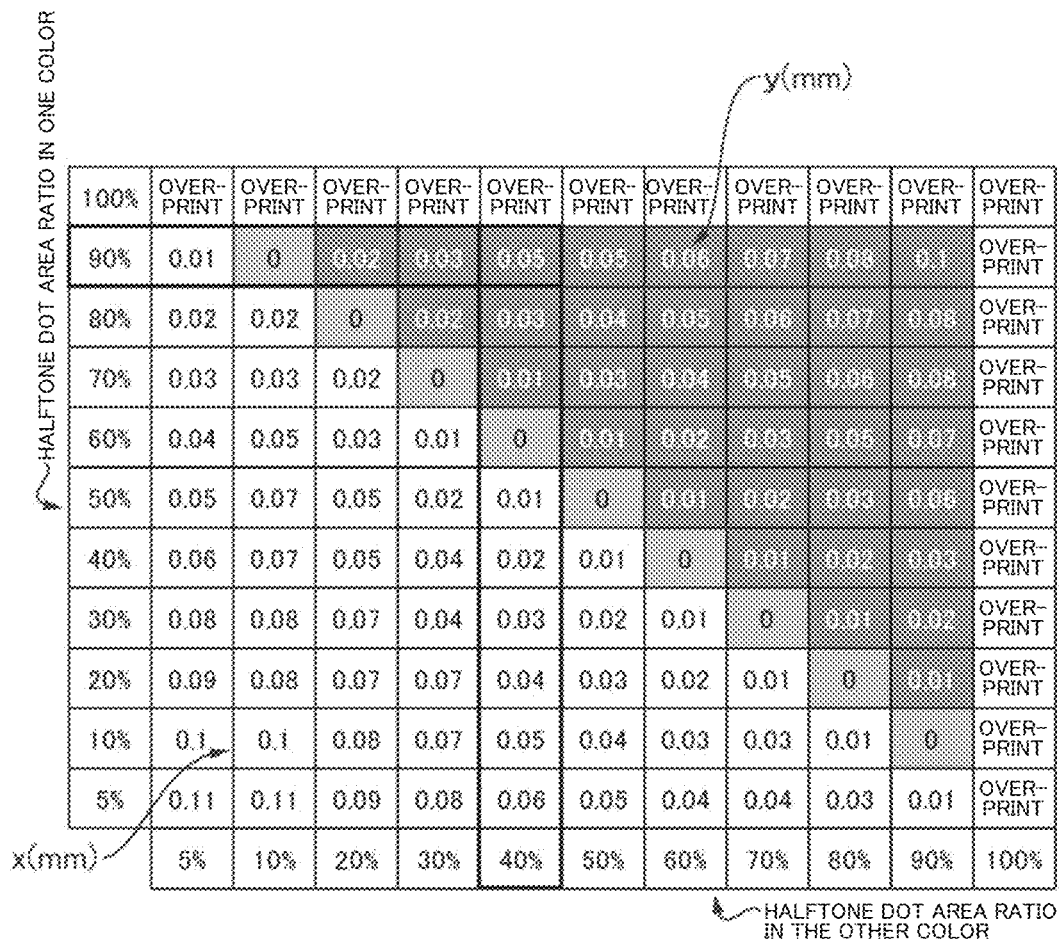
FIG. 4 illustrates the relationship between the sum of the halftone dot area ratio of one color and the halftone dot area ratio of the other color and the dimension of the gap or the dimension of the overmask.

FIGS. 3A and 3B illustrate gap X and overmask Y formed with one color and the other color targeted for the knockout method. One color is the magenta M, and the knockout of a halftone dot is formed in the magenta M. The other color is the cyan C, and a halftone dot in the cyan C is formed at the position of the knockout of the halftone dot in the magenta M. FIG. 4 illustrates the relationship between the sum of the halftone dot area ratio of one color and the halftone dot area ratio of the other color and dimension x of the gap X or dimension y of the overmask Y.

To set the halftone dot area ratio of each of one color and the other color targeted for the knockout method, the halftone dot forming condition setting section 12 sets the halftone dot area ratio, based on the sum of the halftone dot area ratio of one color and the halftone dot area ratio of the other color. To be more specific, for each of the pixels, when the sum of the halftone dot area ratio of one color and the halftone dot area ratio of the other color is smaller than 100%, the halftone dot forming condition setting section 12 sets the conditions such that the gap X from the knockout of the halftone dot in one color is formed around the halftone dot in the other color. In addition, for each of the pixels, when the sum of the halftone dot area ratio of one color and the halftone dot area ratio of the other color is greater than 100%, the halftone dot forming condition setting section 12 sets the conditions such that the halftone dot in the other color penetrates the periphery of the halftone dot in one color to form the overmask Y. The overmask Y is formed is that the central location of the halftone dot in the other color approximately matches the central location of the knockout of the halftone dot in one color, and the size of the halftone dot in the other color is greater than the size of the knockout of the halftone dot in one color. For the overmask Y, the ink in one color may put on the ink in the other color, and the ink in the other color may put on the ink in one color. In addition, with the embodiment, the knockout is applied in two colors, but the gap X and the overmask Y may be formed when the knockout is applied in three or more colors. Moreover, the shape of a halftone dot is not limited to a circle, but may be a polygon or others. Here, the halftone dot area ratio is the ratio of the halftone dot area to the unit area, and indicates the degree of the shading of the color.

The example illustrated in FIG. 3A indicates a case where the sum of the halftone dot area ratio of the magenta M as one color and the halftone dot area ratio of the cyan C as the other color is smaller than 100%. In this case, the gap X having the dimension x from the magenta M as one color is formed around the halftone dot in the cyan C as the other color. It is preferred that the gap X is formed along the entire circumference of the periphery of a halftone dot. By this means, even though each of the colors fails to be registered, the inks do not easily contact one other, and therefore it is possible to restrain the inks from being mixed and murky. The dimension x of the gap X may be a value obtained by subtracting the radius of the halftone dot in the cyan C as the other color from the radius of the knockout of the halftone dot in the magenta M as one color.

The example illustrated in FIG. 3B indicates a case where the sum of the halftone dot area ratio of the magenta M as one color and the halftone dot area ratio of the cyan C as the other color is greater than 100%. In this case, the overmask Y having the dimension y is formed such that the halftone dot in the cyan C as the other color penetrates the periphery of the halftone dot in the magenta M as one color by the dimension y. It is preferred that the overmask Y is formed along the entire circumference of the periphery of a halftone dot. By this means, even though each of the colors fails to be registered, the base is not easily exposed. The dimension y of the overmask Y may be a value obtained by subtracting the radius of the knockout of the halftone dot in the magenta M as one color from the radius of the halftone dot in the cyan C as the other color.

The halftone dot forming condition setting section 12 can appropriately set the sum of the halftone dot area ratio of one color and the halftone dot area ratio of the other color to control the dimension x of the gap X or the dimension y of the overmask Y, and control the shading of the color represented by overprinting one color and the other color.

In FIG. 4, the dimension x of the gap X and the dimension y of the overmask Y formed by the sum of the halftone dot area ratio of one color and the halftone dot area ratio of the other color are listed in boxes which are the intersections of the halftone dot area ratios of one color described along the vertical axis and the halftone dot area ratios of the other color described along the horizontal axis. In FIG. 4, the numbers in black on the white background indicate the dimension x of the gap X, and the numbers in white on the dark gray background indicate the dimension y of the overmask Y. In addition, the numbers "0" in black on the light gray background indicate a state in which no gap X and overmask Y is formed, that is, one color and the other color are overprinted with a high registration accuracy. Moreover, in FIG. 4, "overprint" written in black on the white background indicates that one color or the other color is 100%.

FIG. 4 illustrates the relationship between the sum of the halftone dot area ratio of one color and the halftone dot area ratio of the other color and the dimension x of the gap X or the dimension y of the overmask Y, when the number of screen lines is 100 lpi (line per inch). In this case, when the halftone dot area ratio of one color is "90%" and the halftone dot area ratio of the other color is "40%", it is seen that the overmask Y having the dimension y of "0.05 mm" is formed. When the halftone dot area ratio of one color is "90%" and the halftone dot area ratio of the other color is "40%", the sum of them is "130%." In addition, when the dimension y of the overmask Y is increased, the area in which one color and the other color contact is increased, and this causes the inks to be easily mixed and murky. Therefore, it is preferred that the sum of the halftone dot area ratio of one color and the halftone dot area ratio of the other color are set to form the overmask Y of the one color and the other color to the extent that the dimension y of the overmask Y does not exceed a predetermined value. Ease of mixing and being murky of inks varies depending on the kind of printing plates, and therefore the sum is set depending on the kind of printing plates.

For each of the pixels forming the overmask Y, the halftone dot forming condition setting section 12 sets the sum of the halftone dot area ratio of one color and the halftone dot area ratio of the other color to a value greater than 100% and equal to or smaller than 125% when the printing plate is a resin letterpress plate, and to a value greater than 100% and equal to or smaller than 150% when the printing plate is a waterless planographic plate. By this means, for the pixels forming the overmask Y, the halftone dot forming condition setting section 12 can set the condition for the knockout method so as to be able to overprint one color and the other color while restraining the inks from being mixed and murky.

Plate-Making Method by Using Plate-Making System

Figure 5:
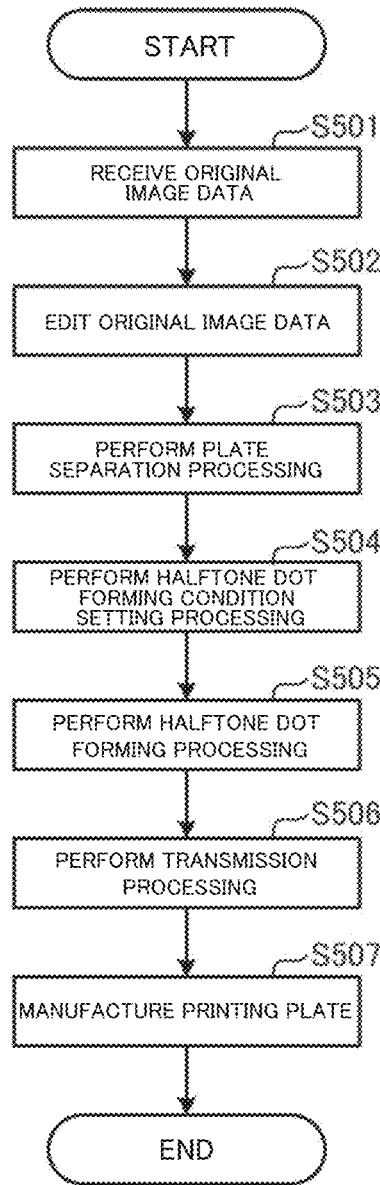
FIG. 5 is a flowchart illustrating a process of a plate-making method for manufacturing printing plates by using the plate-making system illustrated in FIG. 1.

FIG. 5 is a flowchart illustrating a process of a plate-making method for manufacturing printing plates by using the plate-making system 1 illustrated in FIG. 1. FIGS. 6A-6E illustrate the flow of the plate-making method illustrated in FIG. 5.

Step S501 to step S506 illustrated in FIG. 5 may be performed by the data processing device 10, based on operation commands inputted by a user via a user interface provided in the data processing device 10. Step S507 illustrated in FIG. 5 may be performed by the plate manufacturing device 20.

In the step S501, the plate-making system 1 receives original image data by the data processing device 10.

FIG. 6A illustrates an example where the plate-making system 1 receives original image data 100 including colors represented by the magenta M and the cyan C. In the original image data 100 illustrated in FIG. 6A, colors of mixture of the gradation of the magenta M and the gradation of the cyan C are represented in the right region of the page and a white character "F" is disposed on the left region in the cyan C of 100%.

In the step S502, the plate-making system 1 edits the received original image data. The plate-making system 1 corrects the layout to match the printing area of a printed material, and modifies the color tone to edit the original image data.

In the step S503, the plate-making system 1 applies plate separation processing to the edited original image data. The plate-making system 1 separates the colors of the edited original image data into each of the process colors and the spot colors, and creates the plate separation image data for each of the colors.

FIG. 6B illustrates an example where the plate-making system 1 separates the colors of the original image data illustrated in FIG. 6A into the magenta M and the cyan C, and creates plate separation image data 111 in the magenta M and plate separation image data 112 in the cyan C. In the plate separation image data 111 in the magenta M, the density of the magenta M gradually increases from the upper side to the lower side of the right region in the page, and the density of the magenta M is zero in the left region. In the plate separation image data 112 in the cyan C, the density of the cyan C gradually increases once and then gradually decreases from the upper side to the lower side of the right region in the page, and a white character "F" is disposed on the left region in the cyan C of 100%.

In the step S504, the plate-making system 1 performs halftone dot forming condition setting processing to set the halftone dot forming conditions for forming halftone dots of the plate separation image data created by the plate separation processing. In particular, the plate-making system 1 designates the plate separation image data in each of one color and the other color targeted for the knockout method, and sets the halftone dot area ratio of each of the one color and the other color for each of the pixels of the designated plate separation image data. In this case, the plate-making system 1 sets the halftone dot area ratio of one color and the halftone dot area ratio of the other color to appropriately form the gap X and the overmask Y, based on the sum of the halftone dot area ratio of one color and the halftone dot area ratio of the other color.

In the example illustrated in FIG. 6B, the plate-making system 1 designates the plate separation image data in one color targeted for the knockout method as the plate separation image data 111 in the magenta M, and the plate separation image data in the other color as the plate separation image data 112 in the cyan C. Then, as described with reference to FIGS. 3A, 3B and 4, the plate-making system 1 sets the halftone dot area ratio of the magenta M in the plate separation image data 111 and the halftone dot area ratio of the cyan C in the plate separation image data 112 so as to appropriately form the gap X and the overmask Y.

In the step S505, the plate-making system 1 forms halftone dots of the plate separation image data created by the plate separation processing, based on the halftone dot forming conditions set by the halftone dot forming condition setting processing. In particular, when forming the halftone dots of the plate separation image data in one color, the plate-making system 1 creates reverse image data of the plate separation image data in one color by reversing the shading of the one color, and forms halftone dots of the created reverse image data on the negative condition. On the other hand, when forming the halftone dots of the plate separation image data in the other color, the plate-making system 1 forms the halftone dots of the plate separation image data in the other color as is on the positive condition.

FIG. 6C illustrates an example where the plate-making system 1 creates reverse image data 121 by reversing the shading of the magenta M as one color of the plate separation image data 111 illustrated in FIG. 6B. In the reverse image data 121, the density of the magenta M gradually decreases from the upper side to the lower side of the right region in the page, and the magenta M of 100% is disposed in the left region. Here, the plate separation image data 112 illustrated in FIG. 6C is the same as the plate separation image data 112 in the cyan C illustrated in FIG. 6B.

FIG. 6D illustrates an example where the plate-making system 1 forms halftone dots of the reverse image data 121 in the magenta M as one color illustrated in FIG. 6C on the negative condition, and creates image data 131 in the magenta M representing halftone dots. The image data 131 in the magenta M representing the halftone dots is in a state where the shading of the magenta M of the reverse image data 121 illustrated in FIG. 6C is reversed. In the image data 131 in the magenta M representing the halftone dots, a knockout H1 of a halftone dot is formed in the magenta M, based on the shading of the magenta M in the plate separation image data 111 illustrated in FIG. 6B. The knockout H1 of a halftone dot is represented as a white halftone dot is punched out from the magenta M.

Moreover, FIG. 6D illustrates an example where the plate-making system 1 forms halftone dots of the plate separation image data 112 in the cyan C as the other color illustrated in FIG. 6C on the positive condition, and creates image data 132 in the cyan C representing halftone dots. In the image data 132 in the cyan C representing halftone dots, a halftone dot H2 in the cyan C is formed based on the shading of the cyan C in the plate separation image data 112 illustrated in FIG. 6B.

In the step S506, the plate-making system 1 performs transmission processing to transmit the image data representing the halftone dots formed by the halftone dot forming processing, as the image data for plate-making, from the data processing device 10 to the plate manufacturing device 20. In the example of FIG. 6D, the plate-making system 1 transmits the image data 131 in the magenta M representing the halftone dots and the image data 132 in the cyan C representing the halftone dots from the data processing device 10 to the plate manufacturing device 20.

In the step S507, the plate-making system 1 manufactures a printing plate for each of the colors by the plate manufacturing device 20, based on the image data transmitted by the transmission processing. With the example of FIG. 6D, the plate-making system 1 actuates the plate manufacturing device 20 based on the image data 131 representing the halftone dots to manufacture the printing plate for the magenta M. Then, the plate-making system 1 actuates the plate manufacturing device 20 based on the image data 132 representing the halftone dots to manufacture the printing plate for the cyan C. The plate-making method illustrated in FIG. 5 ends at this step.

FIG. 6E illustrates an example of a print image 140 printed on a printed material by using the printing plates for the magenta M and the cyan C which are manufactured based on the image data 131 and 132 illustrated in FIG. 6D. In the print image 140, the central location of the knockout H1 formed in the magenta M approximately matches the central location of the halftone dot H2 in the cyan C, and the magenta M and the cyan C are overprinted by the knockout method.

Operational Advantage

As described above, the plate-making system 1 according to the embodiment is a system configured to manufacture printing plates based on the knockout method. In addition, for each of pixels, when the sum of the halftone dot area ratio of one color and the halftone dot area ratio of the other color targeted for the knockout method is smaller than 100%, the plate-making system 1 according to the embodiment forms the gap X from the knockout of the halftone dot in one color around the halftone dot in the other color, and, when the sum is greater than 100%, the plate-making system 1 forms the overmask Y such that the halftone dot in the other color penetrates the periphery of the knockout of the halftone dot in one color.

Therefore, simply by appropriately setting the sum of the halftone dot area ratio of one color and the halftone dot area ratio of the other color, the plate-making system 1 according to the embodiment can control the dimension x of the gap X, or the dimension y of the overmask Y. To be more specific, the plate-making system 1 according to the embodiment forms the gap X when the sum of the halftone dot area ratios is smaller than 100%, and forms the overmask Y when the sum of the halftone dot area ratios is greater than 100%. By this means, the plate-making system 1 according to the embodiment has a greater allowed value for the misregistration than when printing plates are manufactured by the conventional knockout method, and therefore can manufacture printing plates which provide easy registration. In addition, the plate-making system 1 according to the embodiment restrains the contact of the inks by adopting the knockout method, and therefore can manufacture printing plates capable of restraining the inks from being mixed and murky. Moreover, it makes it easy to cover the base color, and therefore it is possible to manufacture printing plates capable of providing a wide reproducible color gamut, and presenting a high density even by screen tint. By this means, the plate-making system 1 according to the embodiment can manufacture printing plates having a higher color reproducibility than when printing plates are manufactured by the overprint method. Therefore, the plate-making system 1 can manufacture printing plates that restrain the inks from being mixed and murky, and provide easy registration and a high color reproducibility by a relatively easy technique.

In addition, the plate-making system 1 according to the embodiment can manufacture printing plates capable of providing a wide reproducible color gamut and presenting a high density even by the screen tint, and therefore can manufacture printing plates that do not need an excess painting thickness and an excess plate pressure and can reduce an amount of ink to be used.

In addition, as compared to when printing plates are manufactured by the overprint method, the plate-making system 1 according to the embodiment does not need to care ink trapping, and therefore does not need to strictly manage the tack value of the inks based on the order of overprinting. By this means, the plate-making system 1 according to the embodiment can manufacture printing plates with little limitation due to the ink property, and therefore can manufacture printing plates with a high degree of freedom.

Moreover, with the plate-making system 1 according to the embodiment, when the printing plate is a resin letterpress plate, the above-described sum is set to a value greater than 100% and equal to or smaller than 125% for the pixels forming the overmask Y, and on the other hand, when the printing plate is a waterless planographic plate, the above-described sum is set to a value greater than 100% and equal to or smaller than 150% for the pixels forming the overmask Y. By this means, the plate-making system 1 according to the embodiment can manufacture printing plates that further restrain the inks from being mixed and murky, and provide easy registration and a high color reproducibility for the pixels forming the overmask Y.

Moreover, with the plate-making system 1 according to the embodiment, the image data representing halftone dots in one color is created by reversing the shading of one color in the plate separation image data extracted by the color separation of the original image data, and forming halftone dots of the reverse image data on the negative condition. Meanwhile, the plate-making system 1 according to the embodiment creates the image data representing halftone dots in the other color by forming halftone dots of the plate separation image data in the other color extracted by the color separation of the original image data. Therefore, the plate-making system 1 according to the embodiment can manufacture printing plates capable of overprinting one color having the knockouts onto the other color by a relatively simple technique. By this means, the plate-making system 1 according to the embodiment can more easily manufacture printing plates that restrain the inks from being mixed and murky and provide easy registration and a high color reproducibility.

Furthermore, the plate-making system 1 according to the embodiment manufactures printing plates to print a two-piece can or a metal plate as a printed material. The printed surface of the two-piece can or the metal plate does not have ink permeability, and therefore, to ease the registration while restraining inks from being mixed and murky is a greater challenge for the conventional printing plates than when the printed material is paper and so forth. Even though the printed material is a two-piece can or a metal plate, the plate-making system 1 according to the embodiment can manufacture printing plates based on the knockout method, and control the dimension x of the gap X, or the dimension y of the overmask Y. Accordingly, even though the printed material is a two-piece can or a metal plate, the plate-making system 1 according to the embodiment can manufacture printing plates capable of restraining the inks from being mixed and murky, and providing easy registration and a high color reproducibility.

Furthermore, the base color of the can body printed by using the plate-making system 1 according to the embodiment is easily covered by the knockout method, and therefore the can body is printed by a technique capable of providing a wide reproducible color gamut and presenting a high density even by the screen tint. This makes it possible to allow the can body printed by using the plate-making system 1 according to the embodiment to have a higher color reproducibility by a relatively simple technique than a can body printed by the overprint method.

Embodiment 2

Configuration of Plate-Making System

Figure 7:
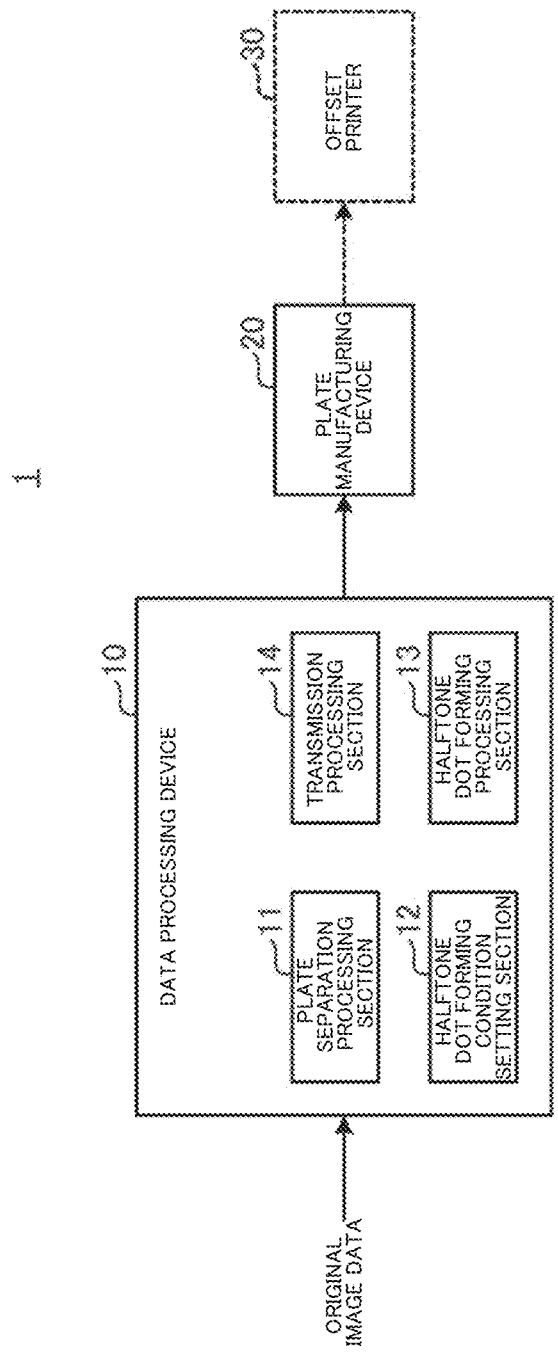
FIG. 7 illustrates the configuration of a plate-making system according to Embodiment 2.

FIG. 7 illustrates the configuration of the plate-making system 1 according to Embodiment 2.

The plate-making system 1 is a system configured to manufacture printing plates attached to a plate-type printer. The plate-making system 1 is a system adopting DTP (Desk Top Publishing) and CTP (Computer To Plate). The plate-making system 1 is a system configured to manufacture printing plates for multicolor printing.

A printed material for the printing plate manufactured by the plate-making system 1 is a can body such as a two-piece can having an approximately cylindrical shape, or a flat metal plate. In addition, the plate-making system 1 is a system configured to manufacture printing plates attached to an offset printer configured to transfer inks via an intermediate transfer member, or a non-offset printer configured not to use the intermediate transfer member.

FIG. 7 illustrates the plate-making system 1 configured to manufacture printing plates attached to an offset printer 30 configured to transfer inks to the outer circumferential surface of a printed material via the intermediate transfer member. The printed material is a two-piece can and so forth having an approximately cylindrical shape. It is preferred that the printing plate manufactured by the plate-making system 1 illustrated in FIG. 7 is a waterless lithographic plate not using dampening water and having non-image areas without ink which are formed by a silicone resin layer and so forth. In addition, the printing plate manufactured by the plate-making system 1 illustrated in FIG. 7 may be a resin letterpress plate having image areas with ink which are formed by a photosensitive resin layer and so forth.

The plate-making system 1 includes a data processing device 10 configured to create image data for plate-making by applying various image processing to original image data, and a plate manufacturing device 20 configured to manufacture printing plates based on the image data for plate-making.

The data processing device 10 is configured to edit, for example, modify the layout and the color tone of the original image data described by the page-description language. Then, the data processing device 10 creates the image data for plate-making by performing plate separation processing such as the color separation, and performing halftone dot forming processing to represent the shading of each of the colors by aggregation of halftone dots, and transmits the image data to the plate manufacturing device 20. The data processing device 10 includes a processor, a memory, and a program implementing the function of the data processing device 10.

The data processing device 10 includes a plate separation processing section 11 configured to perform plate separation processing, a halftone dot forming condition setting section 12 configured to set the conditions of the halftone dot forming processing, a halftone dot forming processing section 13 configured to perform the halftone dot forming processing, and a transmission processing section 14 configured to perform transmission processing to transmit data to the plate manufacturing device 20.

The plate separation processing section 11 separates the colors of the edited original image data into each of the process colors, and creates plate separation image data which is image data for each of the colors extracted by the color separation. The process colors according to the embodiment are seven colors, for example, the cyan C, the magenta M, yellow Y, red R, green G, blue B, and black K. Details of the color separation will be described later with reference to FIG. 8A to FIG. 11.

The halftone dot forming condition setting section 12 sets halftone dot forming conditions to form halftone dots of the plate separation image data created by the plate separation processing section 11. The halftone dot forming conditions are set to the plate separation image data for each of the colors. The halftone dot forming conditions include the halftone dot shape, the halftone dot area ratio, the number of screen lines, and the screen angle for each of the colors, as well as the conditions for the knockout method and the overprint method.

The plate-making system 1 manufactures printing plates capable of representing colors other than the process colors extracted by the color separation, by overprinting the inks in the process colors extracted by the color separation. In this case, by performing the color separation by a technique described later with reference to FIG. 8A to FIG. 11, the plate-making system 1 can manufacture printing plates capable of representing an intended target color by overprinting two colors or three colors of the process colors extracted by the color separation.

When the target color is represented by overprinting the two colors of the process colors extracted by the color separation, the plate-making system 1 manufactures printing plates capable of overprinting the two colors by the knockout method. Meanwhile, when the target color is represented by overprinting three colors of the process colors extracted by the color separation, the plate-making system 1 manufactures printing plates capable of overprinting two of the three colors by the knockout method, and overprinting the remaining one by the overprint method.

The knockout method is a technique to form knockouts of the halftone dots in one of the two colors to be overprinted, and overprint halftone dots in the other color onto the positions of the knockouts. With the knockout method, the ink in one color and the ink in the other color are overpainted without contacting one another as much as possible.

With the overprint method, no knockout is formed for the halftone dots in both of the two colors to be overprinted. With the overprint method, at least part of the halftone dots in one of the two colors to be overprinted is put on the halftone dots in the other color, and therefore the ink in one color and the ink in the other color contact one another, and are overprinted.

The halftone dot forming condition setting section 12 designates plate separation image data in the two colors targeted for the knockout method and plate separation image data in the color targeted for the overprint method. Then, the halftone dot forming condition setting section 12 sets the halftone dot area ratios for each of the pixels of the designated plate separation image data. Details of the halftone dot forming conditions for the knockout method and the overprint method will be described later with reference to FIG. 8A to FIG. 11.

The halftone dot forming processing section 13 forms halftone dots of the plate separation image data created by the plate separation processing section 11, based on the halftone dot forming conditions set by the halftone dot forming condition setting section 12. The image data representing the halftone dots is binary data such as 1 bit TIFF (Tagged Image File Format). The image data representing the halftone dots is used as image data for plate-making when the plate manufacturing device 20 manufactures printing plates. The halftone dot forming processing section 13 may be configured as a software RIP (Raster Image Processor).

The halftone dot forming processing section 13 forms halftone dots of the plate separation image data for each of the two colors targeted for the knockout method on the different condition between one and the other of the two colors. To be more specific, to form halftone dots of the plate separation image data in one of the two colors, the halftone dot forming processing section 13 creates reverse image data once by reversing the shading of the one color, and forms halftone dots of the created reverse image data on the negative condition. On the negative condition, for each of the pixels, the lower the density of the color is, the higher the halftone dot area ratio is. On the other hand, to form halftone dots of the plate separation image data in the other of the two colors, the halftone dot forming processing section 13 forms halftone dots of the plate separation image data in the other color as is on the positive condition. On the positive condition, for each of the pixels, the higher the density of the color is, the higher the halftone dot area ratio is.

The transmission processing section 14 performs processing to transmit the image data representing the halftone dots formed by the halftone dot forming processing section 13 to the plate manufacturing device 20 as image data for plate-making.

The plate manufacturing device 20 manufactures a printing plate for each of the colors based on the image data transmitted from the transmission processing section 14 of the data processing device 10, that is, the image data representing the halftone dots for each of the colors. It is preferred that the plate manufacturing device 20 is a device configured to manufacture the above-described waterless planographic plate. The plate manufacturing device 20 can manufacture a printing plate by exposing a silicone resin layer to the laser based on the image data representing the halftone dots for each of the colors, peeling the cured silicone resin layer, and develops the plate to form the image areas and the non-image areas.

Color Separation, Knockout Method and Overprint Method

Figure 9:
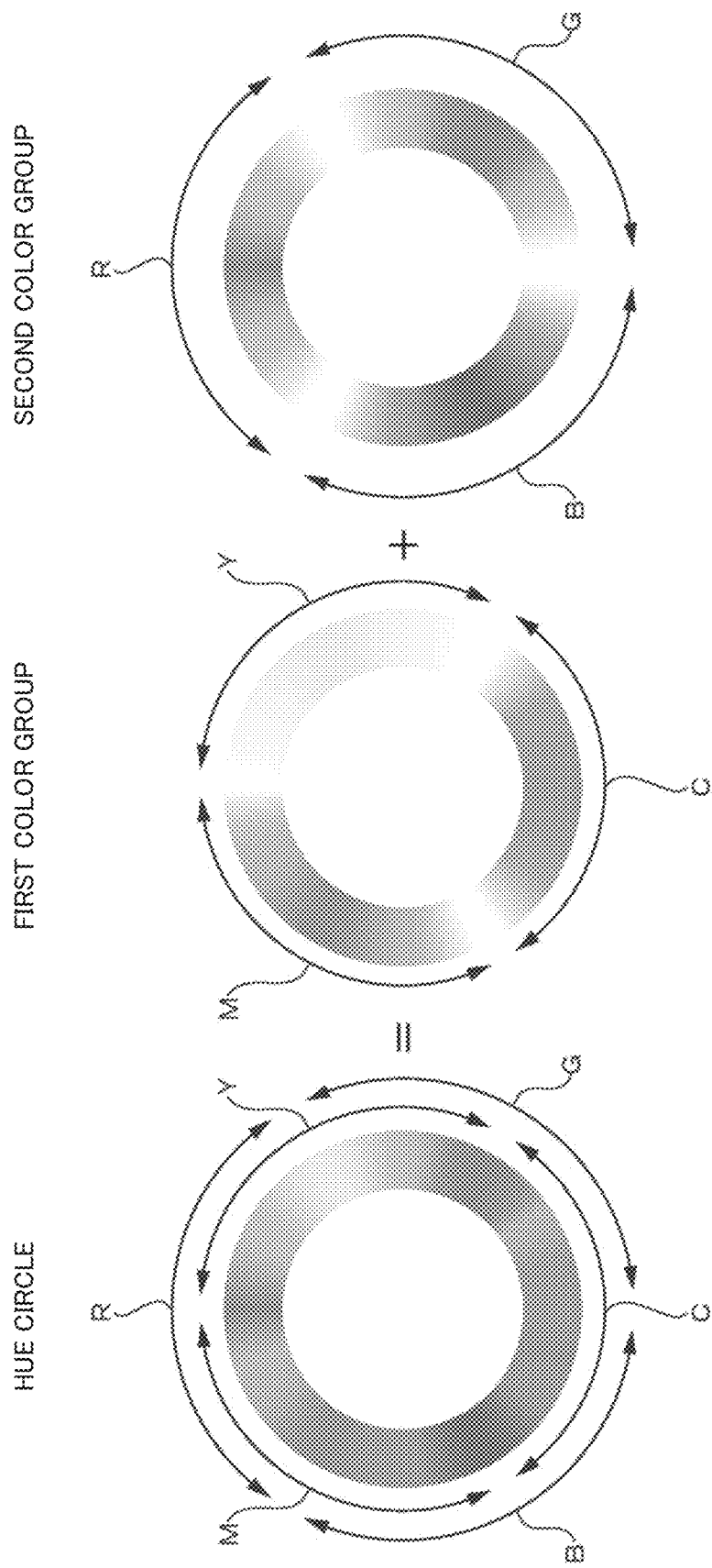
FIG. 9 illustrates a first group and a second group of the ranges of color components extracted by the color separation using the hue circle.
Figure 10A:
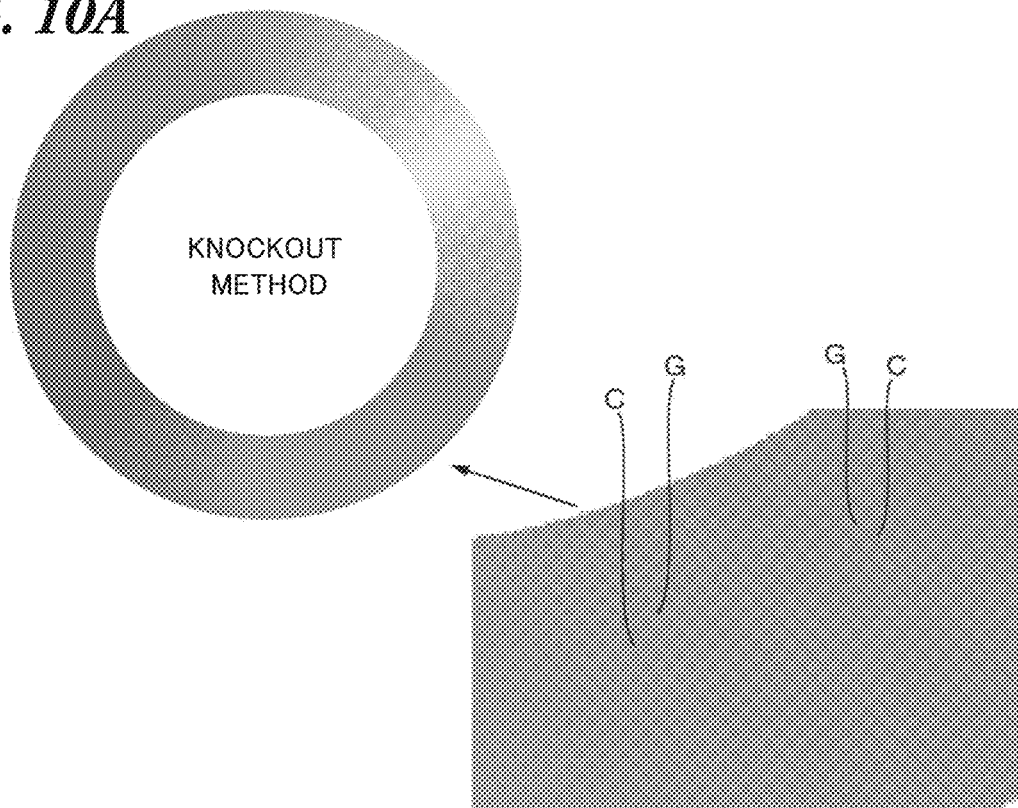
FIG. 10A illustrates an example of the knockout method for overprinting two colors extracted by the color separation using the hue circle.
Figure 10B:
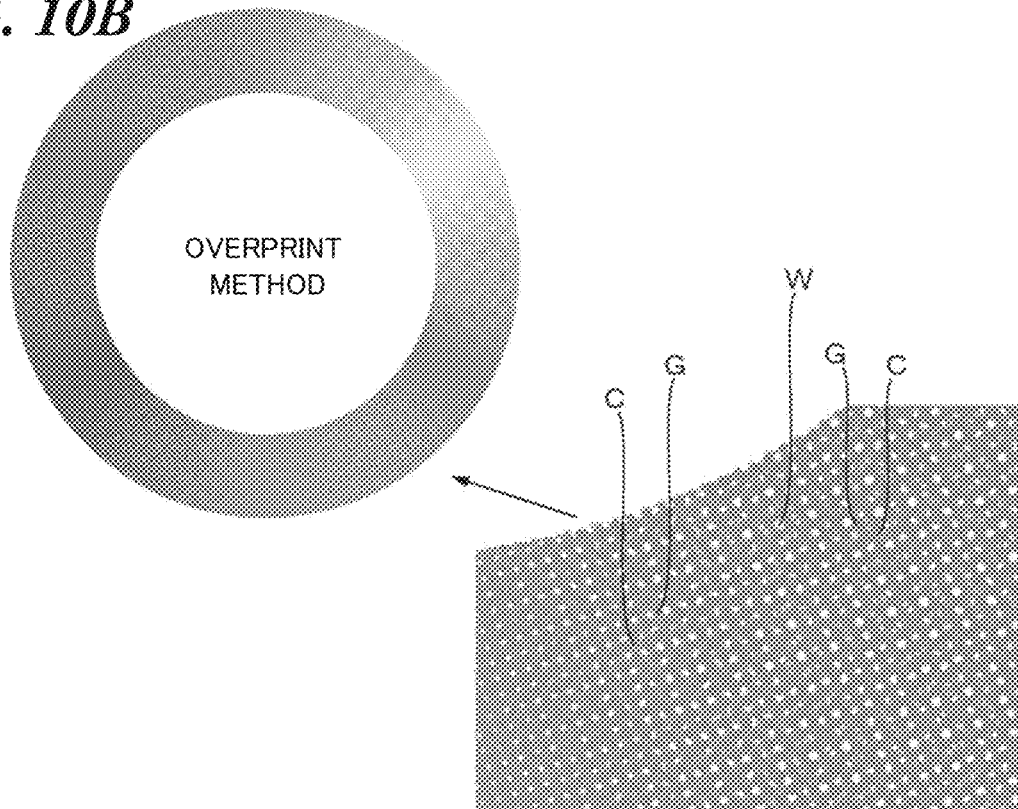
FIG. 10B illustrates an example of the overprint method for overprinting two colors extracted by the color separation using the hue circle.

FIGS. 8A and 8B illustrate color separation using a hue circle. FIG. 9 illustrates ranges of color components extracted by the color separation using the hue circle, which are grouped into a first color group and a second color group. FIGS. 10A and 10B illustrate an example where two colors extracted by the color separation using the hue circle are overprinted by the knockout method and the overprint method.

For the color separation of the original image data, the plate separation processing section 11 performs the color separation separately between lightness components and hue components. To be more specific, the plate separation processing section 11 extracts the lightness component as the black K by GCR (gray component replacement), and extracts the hue components as the cyan C, the magenta M, the yellow Y, the red R, the green G, or the blue B by the color separation using the hue circle.

The color separation using the hue circle is a technique to separate the hue components of the target color into the cyan C, the magenta M, the yellow Y, the red R, the green G, and the blue B in a balanced manner based on the hue circle, and extract them. With the color separation using the hue circle, the hue components of the target color are represented by the cyan C, the magenta M, and the yellow Y, and a color mixture of the magenta M and the yellow Y is substituted for the red R, a color mixture of the yellow Y and the cyan C is substituted for the green G, and a color mixture of the cyan C and the magenta M is substituted for the blue B.

With the color separation using the hue circle, the hue components of the target color are separated in a balanced manner by using the cyan C, the magenta M and the yellow Y which are the three primary colors of subtractive color mixture, and the red R, the green G, and the blue B which are the three primary colors of additive color mixture, and therefore it is possible to reproduce all the colors represented by the hue circle in principle, and secure a wide color gamut. Therefore, with the embodiment, the process colors are seven colors including the black K in addition to six colors, the cyan C, the magenta M, the yellow Y, the red R, the green G, and the blue B, and they are overprinted to represent colors other than the process colors.

FIG. 8A illustrates the range of each of the components, the cyan C, the magenta M, the yellow Y, the red R, the green G, and the blue B extracted by the color separation using the hue circle. FIG. 8B illustrates the range of each of the components, the cyan C, the magenta M, and the yellow Y extracted by the color separation using the hue circle divided only into the cyan C, the magenta M, and the yellow Y.

As compared between FIG. 8A and FIG. 8B, it is seen that the range of each of the components extracted by the color separation using the hue circle is narrower than when the hue circle is divided only into the cyan C, the magenta M, and the yellow Y. In this way, the hue components are separated using the hue circle, and by this means, when two colors other than the black K are overprinted by the overprint method, it is possible to reduce the area of the overlapping part of one and the other of the two colors. Consequently, by separating the hue components using the hue circle, it is possible to secure a wide color gamut and restrain the inks in colors other than the black K from being mixed and murky.

Here, with the embodiment, among the six colors extracted by separating the hue components using the hue circle, a color group of the cyan C, the magenta M, and the yellow Y which are the three primary colors of subtractive color mixture is defined as a first color group, and a color group of the red R, the green G, and the blue B which are complementary colors of the first color group and the three primary colors of additive color mixture is defined as a second group.

The range of each of the components, the cyan C, the magenta M, and the yellow Y constituting the first color group is spaced from each other and does not overlap each other as illustrated in FIG. 9. In the same way, the range of each of the components, the red R, the green G, and the blue B constituting the second color group is spaced from each other and does not overlap each other as illustrated in FIG. 9. That is, the first color group is constituted by the cyan C, the magenta M, and the yellow Y having the hue components not overlapping each other, and the second color group is constituted by the red R, the green G, and the blue B having the hue components not overlapping each other.

As described above, when the two colors other than the black K which are extracted by the color separation using the hue circle are overprinted by the overprint method, it is possible to reduce the area of the overlapping part of the colors. However, in order to secure the color gamut, it is inevitable to overlap the colors to some extent, and the inks may be mixed and murky due to the overprinting. On the other hand, when the two colors are overprinted by the knockout method, the inks in the two colors do not contact one another as much as possible. In addition, when one color of the first color group and one color of the second color group are overprinted by the knockout method, the two colors with closer tones are overprinted in the knockout method than when two colors of the cyan C, the magenta M, and the yellow Y which are the three primary colors of subtractive color mixture are overprinted in the knockout method, and therefore the inks may not easily be mixed and murky even though the two colors contact one another.

Therefore, when the plate-making system 1 represents the hue components of the original image data by overprinting two colors other than the black K extracted by the color separation using the hue circle, the halftone dot forming condition setting section 12 sets the condition such that the two colors are overprinted by the knockout method. In particular, when one of the two colors belongs to the first group, and the other belongs to the second group, the halftone dot forming condition setting section 12 sets the condition such that the one color belonging to the first group and the other belonging to the second group are overprinted by the knockout method. By this means, the plate-making system 1 can manufacture printing plates capable of providing a wide color gamut and restraining the inks from being mixed and murky as much as possible.

FIG. 10A illustrates an example where the cyan C and the green G extracted by the color separation using the hue circle are overprinted by the knockout method. In the example of FIG. 10A, it is seen that knockouts are formed at positions in which one of the cyan C and the green G is put on the other color, and the halftone dots in the one color are located at positions of the knockouts in the other color.

FIG. 10B illustrates an example where the cyan C and the green G extracted by the color separation using the hue circle are overprinted by the overprint method. Here, the halftone dot area ratio is the same as that of FIG. 10A. With the example of FIG. 10B, it is seen that at least part of the halftone dots in one of the cyan C and the green G is put on the halftone dots in the other color. Moreover, with the example of FIG. 10B, it is seen that white W as the base color is exposed.

As compared between FIG. 10A and FIG. 10B, with the knockout method, it is possible to restrain contact of the inks and easily cover the base color, and therefore to provide a wider color gamut and present a higher density even by the screen tint than when the overprint method is adopted.

In addition, with the plate-making system 1, the plate separation processing section 11 extracts the lightness components of the original image data as the black K by the GCR. The plate-making system 1 manufactures printing plates capable of representing the lightness components of the original image data by overprinting the extracted black K onto the colors other than the black K which represent the hue components. With the plate-making system 1, to represent the lightness components of the original image data, the halftone dot forming condition setting section 12 sets the condition such that the black K is overprinted onto the colors other than the black K which represent the hue components by the overprint method. By adopting the overprint method, the screen angle and the number of screen lines of the halftone dots in the black K do not need to match those of the two colors other than the black K, and can be freely set. In this case, the halftone dot forming condition setting section 12 sets the screen angle and the number of screen lines of the halftone dots in the black K to values that can restrain the occurrence of moire. To restrain the occurrence of moire, it is preferred that the screen angle of the halftone dots in the black K is different from the screen angles of the halftone dots in the two colors other than the black K which are overprinted by the knockout method.

When the inks in the colors other than the ink in the black K are put on the ink in the black K, wetted ink in the black K is transferred to the printing plates for the colors other than the black K, and then may be mixed into ink reservoirs for the colors other than the black K from the printing plates via foam rollers and so forth. Then, the inks in the colors other than the black K are mixed with the ink in the black K and become murky to lower the color tones, and therefore may immediately become unavailable.

In contrast, when the ink in the black K is put on the inks in the colors other than the black K, even though wetted inks in the colors other than the black K are transferred to the printing plate for the black K and mixed into the ink reservoir, the color tone of the ink in the black K is not changed much, and therefore may not immediately become unavailable. Therefore, this case where the ink in the black K is put on the inks in the colors other than the black K can more restrain the inks from becoming murky than the former case.

Therefore, with the plate-making system 1, to represent the lightness components of the original image data, the halftone dot forming condition setting section 12 sets the condition such that the black K is overprinted onto the colors other than the black K which represent the hue components by the overprint method. By this means, the plate-making system 1 can manufacture printing plates capable of restraining the occurrence of moire, and also restraining the inks in the colors other than the black K from being mixed with the black K and becoming murky.

In this way, with the plate-making system 1, the plate separation processing section 11 separates the hue components of the original image data into the cyan C, the magenta M, the yellow Y, the red R, the green G, and the blue B by using the hue circle. Then, with the plate-making system 1, to represent the hue components of the original image data by overprinting two process colors other than the black K, the halftone dot forming condition setting section 12 sets the condition such that the two process colors are overprinted by the knockout method. Moreover, with the plate-making system 1, to represent the lightness components of the original image data, the halftone dot forming condition setting section 12 sets the condition such that the black K is overprinted onto the process colors other than the black K which represent the hue components, by the overprint method.

That is, the plate-making system 1 manufactures printing plates to represent predetermined colors by overprinting three colors among the above-described seven process colors. That is, the two colors other than the black K which represent the hue components of the original image data, and the black K representing the lightness components of the original image data are overprinted. Then, with the plate-making system 1, among the overprinted three colors, the two colors representing the hue components are overprinted by the knockout method, and the black K as the remaining one of the three colors and the two colors representing the hue components are overprinted by the overprint method. In addition, with the plate-making system 1, the two colors other than the black K which represent the hue components of the original image data are one of the cyan C, the magenta M, and the yellow Y belonging to the first color group and one of the red R, the green G and the blue B belonging to the second color group. By this means, the plate-making system 1 can manufacture printing plates capable of secur-ing a wide color gamut only by the process colors, restraining the occurrence of moire, and restraining the inks from being mixed and murky.

Figure 11:
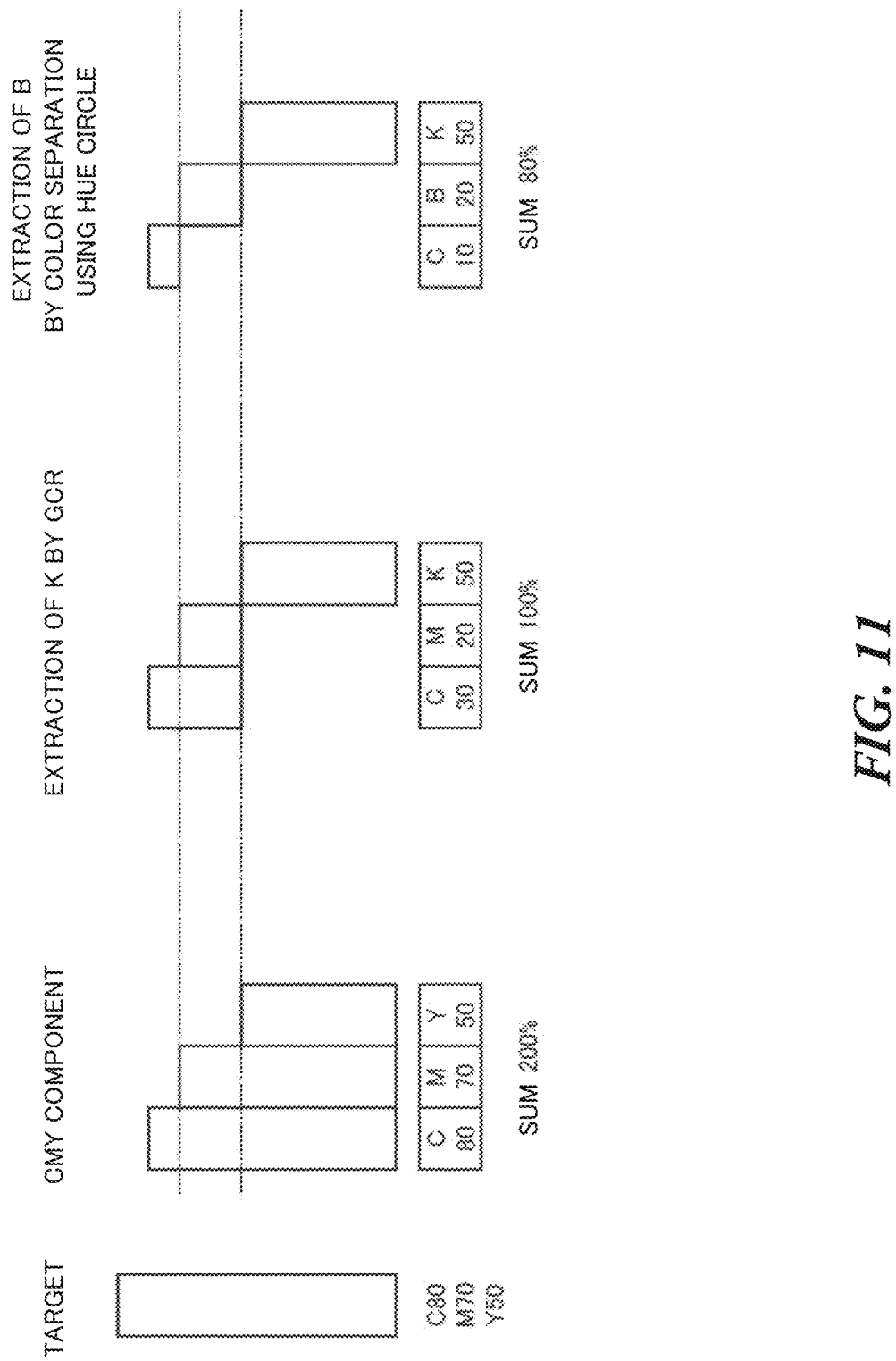
FIG. 11 illustrates specific examples of the color separation of a targeted color.

FIG. 11 illustrates specific examples of the color separation of a target color.

FIG. 11 illustrates an example where a target color is constituted by the cyan C having a density of 80%, the magenta M having a density of 70%, and the yellow Y having a density of 50%. The sum of the densities of the colors is 200%.

When the target color is separated, the plate-making system 1 first extracts the color mixture of three colors, the cyan C, the magenta M, and the yellow Y as the black K by the GCR. By this means, the target color is substituted for a color constituted by the black K having the density of 50%, the cyan C having the density of 30%, and the magenta M of the density of 20%. The sum of the densities of the colors is reduced to 100%.

Next, the plate-making system 1 extracts the color mixture of two colors, the cyan C and the magenta M as the blue B by the color separation using the hue circle. By this means, the target color is substituted for a color constituted by the black K having the density of 50%, the blue B having the density of 20%, and the cyan C having the density of 10%. The sum of the densities of the colors is reduced to 80%.

In this way, by the color separation using the GCR and the hue circle, the plate-making system 1 can manufacture printing plates capable of securing a wide color gamut only by the process colors, restraining the occurrence of moire, restraining the inks from being mixed and murky, and reducing the amount of ink to be used.

Plate-Making Method by Using Plate-Making System

Figure 12:
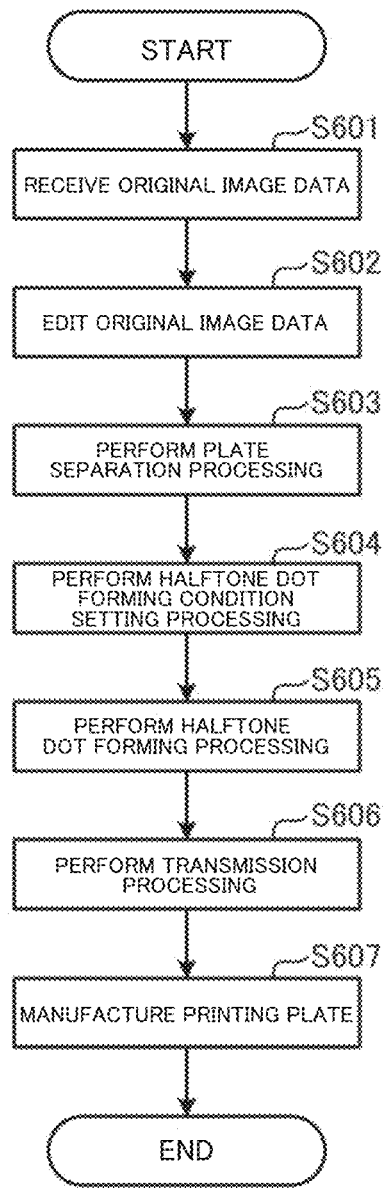
FIG. 12 is a flowchart illustrating a process of the plate-making method for manufacturing printing plates by using the plate-making system illustrated in FIG. 7.

FIG. 12 is a flowchart illustrating a process of a plate-making method for manufacturing printing plates by using the plate-making system 1 illustrated in FIG. 7.

Step S601 to step S606 illustrated in FIG. 12 may be performed by the data processing device 10, based on operation commands inputted by a user via a user interface provided in the data processing device 10. Step S607 illustrated in FIG. 12 may be performed by the plate manufacturing device 20.

In the step S601, the plate-making system 1 receives original image data by the data processing device 10.

In the step S602, the plate-making system 1 edits the received original image data. The plate-making system 1 corrects the layout to match the printing area of a printed material, and modifies the color tone to edit the original image data.

In the step 603, the plate-making system 1 applies plate separation processing to the edited original image data. The plate-making system 1 separates the colors of the edited original image data into each of the process colors, and creates the plate separation image data for each of the colors.

In the step S604, the plate-making system 1 performs halftone dot forming condition setting processing to set the halftone dot forming conditions for forming halftone dots of the plate separation image data created by the plate separation processing. In particular, the plate-making system 1 designates the plate separation image data in each of one color and the other color targeted for the knockout method, and sets the halftone dot area ratio of each of the one color and the other color for each of the pixels of the designated plate separation image data. One color targeted for the knockout method is one of the cyan C, the magenta M, and the yellow Y belonging to the first color group, and the other is one of the red R, the green G, and the blue B belonging to the second color group. Moreover, the plate-making system 1 designates the plate separation image data in the color targeted for the overprint method, and sets the halftone dot area ratio, the number of screen lines, the screen angle and so forth. The color targeted for the overprint method is the black K.

In the step S605, the plate-making system 1 forms halftone dots of the plate separation image data created by the plate separation processing, based on the halftone dot forming conditions set by the halftone dot forming condition setting processing. In particular, when forming halftone dots of the plate separation image data in one color targeted for the knockout method, the plate-making system 1 creates reverse image data by reversing the shading of the one color, and forms halftone dots of the created reverse image data on the negative condition. Meanwhile, when forming halftone dots of the plate separation image data in the other color targeted for the knockout method, the plate-making system 1 forms halftone dots of the plate separation image data in the other color as is on the positive condition. Moreover, when forming halftone dots of the plate separation image data in the color targeted for the overprint method, the plate-making system 1 forms halftone dots of this plate separation image data as is on the positive condition.

In the step S606, the plate-making system 1 performs transmission processing to transmit the image data representing the halftone dots formed by the halftone dot forming processing, as the image data for plate-making, from the data processing device 10 to the plate manufacturing device 20.

In the step S607, the plate-making system 1 manufactures a printing plate for each of the colors by the plate manufacturing device 20, based on the image data transmitted by the transmission processing. The plate-making method illustrated in FIG. 12 ends at this step.

Operational Advantage

As described above, the plate-making system 1 according to the embodiments is a plate-making system configured to manufacture printing plates capable of representing colors by overprinting the halftone dots in three colors of the plurality of process colors. Then, with the plate-making system 1 according to the embodiments, two of the three colors are overprinted by the knockout method, and the remaining one of the three colors and the two colors overprinted by the knockout method are overprinted by the overprint method. By this means, the plate-making system 1 can manufacture printing plates capable of securing a wide color gamut only by the process colors, restraining the occurrence of moire, and restraining the inks from being mixed and murky.

Moreover, with the plate-making system 1 according to the embodiments, one of the colors targeted for the knockout method belongs to the first color group constituted by the colors having the hue components which do not overlap each other, and the other targeted for the knockout method belongs to the second color group constituted by the colors having the hue components which do not overlap each other. That is, one color and the other color belong to the different color groups, and the ranges of the components may overlap each other. However, even though the ranges of the components overlap each another, the plate-making system 1 according to the embodiments can overprint the inks without contact of the inks as much as possible by the knockout method. Therefore, the plate-making system 1 according to the embodiments can manufacture printing plates capable of securing a wide color gamut only by the process colors, restraining the occurrence of moire, and restraining the inks from being mixed and murky.

Moreover, with the plate-making system 1 according to the embodiments, the plurality of process colors are seven colors, the cyan C, the magenta M, the yellow Y, the red R, the green G, the blue B, and the black K. Then, with the plate-making system 1 according to the embodiments, the first color group is constituted by the cyan C, the magenta M, and the yellow Y, the second color group is constituted by the red R, the green G, and the blue B, and the above-described remaining one of the three colors is the black K. That is, the first color group is constituted by the three primary colors of subtractive color mixture, and the second color group is constituted by the three primary colors of additive color mixture, and therefore the plate-making system 1 according to the embodiments can manufacture printing plates capable of extending the available color gamut only by the process colors. In addition, the color targeted for the overprint method is the black K, and therefore the plate-making system 1 according to the embodiments can manufacture printing plates capable of restraining the inks in colors other than the black K from being mixed with the black K and becoming murky. Therefore, the plate-making system 1 according to the embodiments can manufacture printing plates capable of restraining the occurrence of moire, extending the available color gamut only by the process colors, and restraining the inks from being mixed and murky.

Moreover, with the plate-making system 1 according to the embodiments, the halftone dots in the above-described remaining one of the three colors are disposed at a screen angle different from those of the halftone dots in the two colors targeted for the knockout method. Therefore, even though the halftone dots in the above-described remaining one of the three colors are overprinted by the overprint method, the plate-making system 1 according to the embodiments can restrain the occurrence of moire. Consequently, the plate-making system 1 according to the embodiments can manufacture printing plates capable of securing a wide color gamut only by the process colors, restraining the inks from being mixed and murky, and restraining the occurrence of moire.

Moreover, the plate-making system 1 according to the embodiments manufactures printing plates to print a two-piece can or a metal plate as a printed material. The printed surface of the two-piece can or the metal plate does not have ink permeability, and therefore, to restrain the inks from being mixed and murky while securing the color gamut only by the process colors is a greater challenge for the conventional printing plates than when the printed material is paper and so forth. Even though the printed material is a two-piece can or a metal plate, the plate-making system 1 according to the embodiments can manufacture printing plates capable of representing colors by overprinting the halftone dots in three colors of the plurality of process colors. Accordingly, even though the printed material is a two-piece can or a metal plate, the plate-making system 1 according to the embodiments can manufacture printing plates capable of securing a wide color gamut only by the process colors, restraining the occurrence of moire, and restraining the inks from being mixed and murky.

Furthermore, with the plate-making system 1 according to the embodiments, a can body is printed such that two of the three colors are overprinted by the knockout method, and the remaining one of the three colors, and the two colors overprinted by the knockout method are overprinted by the overprint method. By this means, with the plate-making system 1 according to the embodiments, a can body can be printed so that a wide color gamut is secured only by the process colors, the inks is restrained from being mixed and murky, the occurrence of moire is restrained.

Another Embodiment

With the above-described embodiments, the plate-making system 1 is a system configured to manufacture printing plates to print a can body such as a two-piece can or a metal plate as a printed material. However, this is by no means limiting. The plate-making system 1 may be a system configured to manufacture printing plates to print a three-dimensional object made of nonmetallic material such as a jar and a bottle. Moreover, the plate-making system 1 may be a system configured to manufacture printing plates to print a flat object such as paper, a label, a film, and a sheet.

According to the invention, it is possible to manufacture printing plates capable of restraining inks from being mixed and murky, and providing easy registration and a high color reproducibility. In addition, according to the invention, it is possible to provide a can body printed by a technique capable of restraining inks from being mixed and murky, and providing easy registration and a high color reproducibility.

Moreover, according to the invention, it is possible to manufacture printing plates capable of securing a wide color gamut only by process colors, restraining the occurrence of moire, and restraining inks from being mixed and murky. Furthermore, according to the invention, it is possible to provide a can body printed by a technique capable of securing a wide color gamut only by process colors, restraining the occurrence of moire, and restraining inks from being mixed and murky.

Others

The above-described embodiments including a modification may apply their features to each other. The above-described embodiments are not intended to limit the subject matter of the invention but may be modified to the extent not to depart from the scope of the claims.

The terms used in the above-described embodiments and the claims should be construed as non-exclusive terms. For example, the term "including" should be construed not to limit the subject described as being included. The term "containing" should be construed not to limit the subject described as being contained. The term "comprising" should be construed not to limit the subject described as being comprised. The term "having" should be construed not to limit the subject as being had.

The invention claimed is:

1. A plate-making method for manufacturing a printing plate based on image data separated into each of colors and representing halftone dots, the plate-making method comprising:

manufacturing the printing plate based on a knockout method in which knockouts of halftone dots in one color are formed, and halftone dots in the other color are overprinted onto positions of the knockouts;

for each of pixels, when a sum of a halftone dot area ratio of the one color and a halftone dot area ratio of the other color is smaller than 100%, forming a gap from a knockout in the one color around a halftone dot in the other color; and for each of pixels, when the sum of the halftone dot area ratio of the one color and the halftone dot area ratio of the other color is greater than 100%, forming an overmask such that the halftone dot in the other color penetrates a periphery of the halftone dot in the one color.

2. The plate-making method according to claim 1, wherein:

the printing plate is a resin letterpress plate; and for each of pixels forming the overmask, the sum is greater than 100% and equal to or smaller than 125%.

3. The plate-making method according to claim 1, wherein:

the printing plate is a waterless planographic plate; and for each of pixels forming the overmask, the sum is greater than 100% and equal to or smaller than 150%.

4. The plate-making method according to claim 1, wherein the image data representing halftone dots in the one color is created by:

creating plate separation image data in the one color extracted by color separation of the original image data;

creating reverse image data by reversing shading of the one color in the created plate separation image data; and forming halftone dots of the created reverse image data on a negative condition such that, for each of the pixels, the lower a density of the one color is, the higher the halftone dot area ratio of the one color is, and wherein the image data representing halftone dots in the other color is created by forming halftone dots of the plate separation image data in the other color extracted by the color separation of the original image data.

5. The plate-making method according to claim 1, wherein a printed material for the printing plate is a two-piece can or a metal plate.

6. A can body on which an image separated into each of colors and representing halftone dots is printed, wherein:

the image is formed based on a knockout method in which knockouts of halftone dots in one color are formed, and halftone dots in the other color are overprinted onto positions of the knockouts;

for each of pixels, when a sum of a halftone dot area ratio of the one color and a halftone dot area ratio of the other color is smaller than 100%, a gap from a knockout in the one color is formed around a halftone dot in the other color; and for each of pixels, when the sum of the halftone dot area ratio of the one color and the halftone dot area ratio of the other color is greater than 100%, an overmask is formed such that the halftone dot in the other color penetrates a periphery of the halftone dot in the one color.

7. A plate-making method for manufacturing printing plates capable of representing colors by overprinting halftone dots in three colors of a plurality of process colors, the plate-making method comprising:

overprinting two colors of the three colors by a knockout method in which knockouts of halftone dots in one color are formed, and halftone dots in the other color are overprinted onto positions of the knockouts; and overprinting a remaining color of the three colors onto the two colors by an overprint method in which at least part of halftone dots in the remaining color is put on the halftone dots in the one color and/or the halftones in the other color.

8. The plate-making method according to claim 7, wherein:
- the one color belongs to a first color group constituted by colors having hue components which do not overlap each other; and
- the other color belongs to a second color group constituted by colors having hue components which do not overlap each other, the colors belonging to the second color group being different from the colors belonging to the first group.

9. The plate-making method according to claim 8, wherein:
- the plurality of process colors are seven colors, cyan, magenta, yellow, red, green, blue and black;
- the first color group is constituted by the cyan, the magenta, and the yellow;
- the second color group is constituted by the red, the green, and the blue; and
- the remaining color is the black.

10. The plate-making method according to claim 7, wherein the halftone dots in the remaining color are disposed at a screen angle different from those of halftone dots in the two colors.

11. The plate-making method according to claim 7, wherein a printed material for the printing plates is a two-piece can or a metal plate.

12. A can body printed to represent colors by overprinting halftone dots in three colors of a plurality of process colors, wherein:
- two colors of the three colors are overprinted by a knockout method in which knockouts of halftone dots in one color are formed, and halftone dots in the other color are overprinted onto positions of the knockouts; and
- a remaining color of the three color is overprinted onto the two colors by an overprint method in which at least part of halftone dots in the remaining color is put on the halftone dots in the one color and/or the halftones in the other color.

* * * * *